United States Patent
Ellis-Monaghan et al.

(10) Patent No.: US 10,642,125 B1
(45) Date of Patent: May 5, 2020

(54) OPTICAL BEAM STEERING WITH DIRECTIONALITY PROVIDED BY SWITCHED GRATING COUPLERS

(71) Applicant: GLOBALFOUNDRIES Inc., Grand Cayman (KY)

(72) Inventors: John J. Ellis-Monaghan, Grand Isle, VT (US); Steven M. Shank, Jericho, VT (US); Vibhor Jain, Essex Junction, VT (US); Anthony K. Stamper, Williston, VT (US); John J. Pekarik, Underhill, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/524,870

(22) Filed: Jul. 29, 2019

(51) Int. Cl.
*G02F 1/313* (2006.01)

(52) U.S. Cl.
CPC ........ *G02F 1/313* (2013.01); *G02F 2201/302* (2013.01); *G02F 2203/24* (2013.01)

(58) Field of Classification Search
None
See application file for complete search history.

(56) References Cited

U.S. PATENT DOCUMENTS

| | | | |
|---|---|---|---|
| 6,960,744 B2 | 11/2005 | Adkisson et al. | |
| H2180 H * | 2/2007 | Brininstool | 385/37 |
| 8,098,968 B2 | 1/2012 | Green et al. | |
| 8,311,374 B2 | 11/2012 | Hochberg et al. | |
| 8,503,841 B2 * | 8/2013 | Kopp | G02B 6/126 385/11 |
| 9,746,746 B2 | 8/2017 | Mazed et al. | |
| 2003/0007202 A1 * | 1/2003 | Moser | G02B 6/2931 359/15 |
| 2009/0067782 A1 * | 3/2009 | Suehiro | G02F 1/3138 385/18 |
| 2009/0080829 A1 * | 3/2009 | Haase | G01L 1/246 385/13 |
| 2016/0246009 A1 * | 8/2016 | Jiang | G02B 6/124 |

(Continued)

FOREIGN PATENT DOCUMENTS

JP    2-183226 A  *  7/1990

OTHER PUBLICATIONS

Dongwei Zhuang et al., "Omnidirectional beam steering using aperiodic optical phased array with high error margin," Opt. Express 26, 19154-19170 (2018).

(Continued)

*Primary Examiner* — Michael Stahl
(74) *Attorney, Agent, or Firm* — Thompson Hine LLP; Anthony Canale (57) ABSTRACT

Structures providing optical beam steering and methods of fabricating such structures. A first grating coupler has a first plurality of grating structures spaced with a first pitch along a first axis. A second grating coupler has a second plurality of grating structures spaced with a second pitch along a second axis. An optical switch is coupled to the first grating coupler and to the second grating coupler. The optical switch is configured to select between the first grating coupler and the second grating coupler for optical signal routing. The second axis of the second grating coupler is aligned non-parallel to the first axis of the first grating coupler.

20 Claims, 5 Drawing Sheets

(56) References Cited

U.S. PATENT DOCUMENTS

| | | | |
|---|---|---|---|
| 2016/0377811 A1* | 12/2016 | Goodwill | G02B 6/2706 |
| | | | 385/24 |
| 2017/0343739 A1* | 11/2017 | Bauters | G02B 6/27 |
| 2017/0371227 A1 | 12/2017 | Skirlo et al. | |
| 2019/0317198 A1* | 10/2019 | Wang | G01S 7/499 |

OTHER PUBLICATIONS

D. M. Gill et al., "Demonstration of Error-Free 32-Gb/s Operation From Monolithic CMOS Nanophotonic Transmitters," in IEEE Photonics Technology Letters, vol. 28, No. 13, pp. 1410-1413, 1 Jul. 1, 2016.

Niklasson et al., "Thermochromic vanadium oxide thin films: Electronic and optical properties", Journal of Physics: Conference Series, vol. 559, conference 1, 2014.

Marc Currie et al., "Characterizing the tunable refractive index of vanadium dioxide," Opt. Mater. Express 7, 1697-1707 (2017).

Arash Joushaghani et al., "Wavelength-size hybrid Si-VO2 waveguide electroabsorption optical switches and photodetectors," Opt. Express 23, 3657-3668 (2015).

F. Van Laere et al., "Compact Focusing Grating Couplers Between Optical Fibers and Silicon-on-Insulator Photonic Wire Waveguides," OFC/NFOEC 2007—2007 Conference on Optical Fiber Communication and the National Fiber Optic Engineers Conference, Anaheim, CA, 2007, pp. 1-3.

\* cited by examiner

OPTICAL BEAM STEERING WITH DIRECTIONALITY PROVIDED BY SWITCHED GRATING COUPLERS

BACKGROUND

The present invention relates to photonics chips and, more particularly, to structures providing optical beam steering and methods of fabricating such structures.

A photonics chip integrates multiple optical components, such as waveguides and optical switches, and multiple electronic components, such as field-effect transistors, into a unified platform. Among other factors, layout area, cost, and operational overhead may be reduced by the integration of both types of components on the photonics chip.

Optical beam steering finds many practical applications as, for example, part of a photonics chip. Beam steering may be accomplished by scanning with mechanical assistance through the use of movable optical elements, such as mirrors, prisms, or lenses. A distinct disadvantage of mechanically-assisted beam steering techniques is the necessity of moving the optical element with a mechanism, such as a micromechanical system, to provide directional changes needed for steering.

Improved structures providing optical beam steering and methods of fabricating such structures are needed.

SUMMARY

In an embodiment of the invention, a structure include a first grating coupler having a first plurality of grating structures spaced with a first pitch along a first axis, a second grating coupler having a second plurality of grating structures spaced with a second pitch along a second axis, and an optical switch coupled to the first grating coupler and to the second grating coupler. The optical switch is configured to select between the first grating coupler and the second grating coupler for optical signal routing. The second axis of the second grating coupler is aligned nonparallel to the first axis of the first grating coupler.

In an embodiment of the invention, a method includes forming a first grating coupler having a first plurality of grating structures spaced with a first pitch along a first axis, forming a second grating coupler having a second plurality of grating structures spaced with a second pitch along a second axis, and forming an optical switch coupled to the first grating coupler and the second grating coupler. The second axis of the second grating coupler is aligned nonparallel to the first axis of the first grating coupler.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
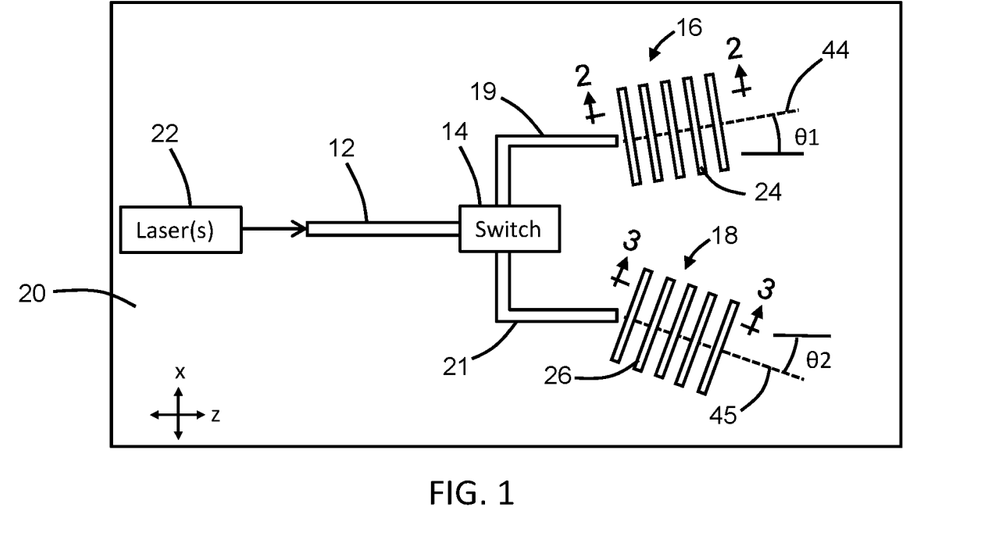
FIG. 1 is a top view of a photonics chip including a structure in accordance with embodiments of the invention.
Figure 2:
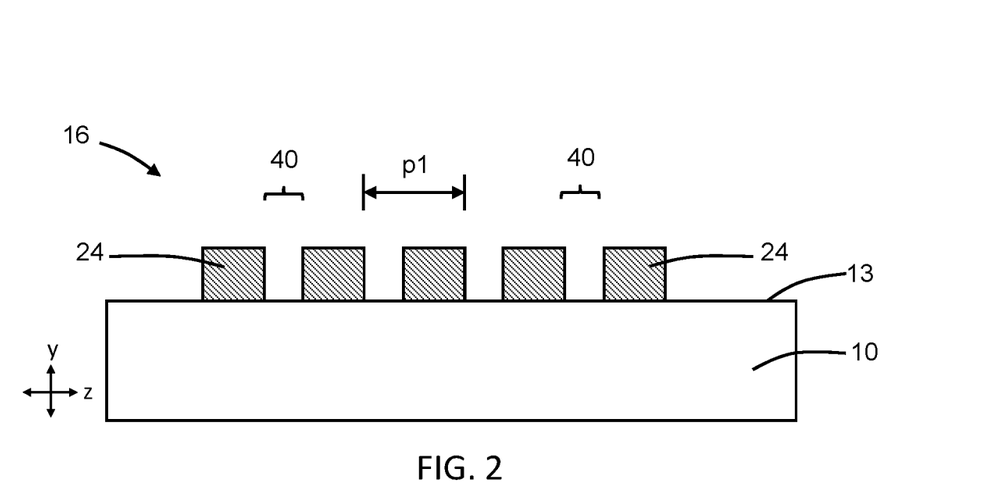
FIG. 2 is an enlarged cross-sectional view of the structure taken generally along line 2-2 in FIG. 1.
Figure 3:
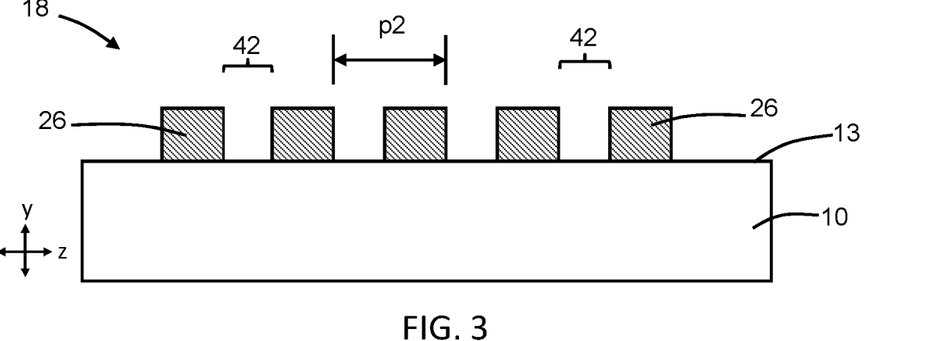
FIG. 3 is an enlarged cross-sectional view of the structure taken generally along line 3-3 in FIG. 1.

With reference to FIGS. 1-3 and in accordance with embodiments of the invention, a structure 10 includes an input waveguide 12, an optical switch 14, a grating coupler 16, and a grating coupler 18 that are located on a substrate 20. The substrate 20 may be, for example, a chip formed from a diced section of a silicon-on-insulator wafer. The top surface 13 of the substrate 20 defines a reference plane, referred to herein as a horizontal plane, for purposes of definition of direction. The input waveguide 12 may be coupled with a laser 22 configured to supply a stream of optical signals characterized by a given wavelength. The optical switch 14 may be a Mach-Zehnder switch, a ring resonator switch, a thermally-controlled coupler, or a vanadium-oxide-based optical switch. The optical switch 14 is coupled to the grating coupler 16 by an optical path provided by a connecting waveguide 19, and the optical switch 14 is coupled to the grating coupler 18 by an optical path provided by a connecting waveguide 21.

The grating couplers 16, 18 operate as diffraction gratings each configured to diffract a stream of optical signals, which is arriving at the structure 10 via the input waveguide 12 from the laser 22, by constructive interference with directionality off of the substrate 20. The grating coupler 16 includes grating structures 24 that are arranged along an axis 44 and that are physically separated by spaces or grooves 40 such that the grating structures 24 are raised relative to the horizontal plane of the substrate 20. The grating coupler 18 also includes grating structures 26 that are arranged along an axis 45 and that are physically separated by spaces or grooves 42 such that the grating structures 26 are raised relative to the horizontal plane of the substrate 20. In an embodiment, the grating structures 24, 26 may be arranged as a group of spaced-apart parallel linear features. In an alternative embodiment, the grating structures 24, 26 may be arranged as a group of concentric curved features that are nested together.

The grating structures 24, 26 may be patterned from a layer of material, such as single-crystal semiconductor material (e.g., single-crystal silicon), silicon nitride, or polycrystalline semiconductor material (e.g., polysilicon), by lithography and etching processes. The grooves 40 between adjacent pairs of the grating structures 24 and the grooves 42 between adjacent pairs of the grating structures 26 may be trenches in a patterned layer that separate the respective grating structures 24, 26 to provide a line-space arrangement. In an embodiment, the grating structures 24, 26 may be concurrently patterned from the same layer of material such that the grating structures 24, 26 are coplanar. In an embodiment, the grating structures 24, 26 may be concurrently patterned from the single-crystal semiconductor material (e.g., single-crystal silicon) of the device layer of a silicon-on-insulator wafer. The input waveguide 12 and at least a portion of the optical switch 14 may be concurrently patterned from the same layer of material by the lithography and etching processes.

The grating structures 24, 26 each have a given periodicity along their respective axes 44, 45 defined by a pitch and a filling factor or duty cycle relating to their dimensions and physical spacing. The pitch of the grating structures 24 of grating coupler 16 represents a distance in a horizontal direction between adjacent pairs of the grating structures 24, and the duty cycle of the grating structures 24 of grating coupler 16 represents a fraction of the area of the grating coupler 16 that is occupied by the grating structures 24. The pitch of the grating structures 26 of grating coupler 18 represents a distance in a horizontal direction between adjacent pairs of the grating structures 26, and the duty cycle of the grating structures 26 of grating coupler 18 represents a fraction of the area of the grating coupler 18 that is occupied by the grating structures 26.

The grating structures 24, 26 have different angular orientations within a horizontal reference plane (e.g., the x-z plane) of the substrate 20 that provide different angles of output from the structure 10 for the diffracted stream of optical signals. The axis 44 associated with the grating structures 24 of the grating coupler 16 may be aligned with an angular orientation given by an angle, $\theta 1$, within the horizontal plane of the substrate 20. The axis 45 associated with the grating structures 26 of the grating coupler 18 may be aligned with an angular orientation given by an angle, $\theta 2$, within the horizontal plane of the substrate 20. In an embodiment, the axes 44, 45 may be nonparallel (i.e., not parallel) such that the angular orientation of the grating structures 24 of grating coupler 16 differs from the angular orientation of the grating structures 26 of the grating coupler 18. The different orientation angles of the grating structures 24, 26 may be referenced relative to a fixed reference axis, such as the z-axis in the horizontal reference plane.

The grating structures 24, 26 can diffract the optical signals with emission angles that are inclined relative to the horizontal reference plane of the substrate 20 (i.e., in the y-direction out of the x-y plane). The angles of emission are governed, among other factors, by grating pitch. In an embodiment, the pitch, p1, of the grating structures 24 along the axis 44 may be substantially equal or equal to the pitch, p2, of the grating structures 26 along the axis 44 such that the grating couplers 16, 18 can diffract the stream of optical signals with equal or substantially identical emission angles, but with different angular orientations $\theta 1$, $\theta 2$. In an embodiment, the pitches of the grating structures 24, 26 may be different such that the grating couplers 16, 18 diffract the stream of optical signals with different emission angles, as well as with different angular orientations $\theta 1$, $\theta 2$.

The optical switch 14 can be operated to route the stream of optical signals arriving via the input waveguide 12 to either the grating coupler 16 or the grating coupler 18, which provides passive beam steering without any mechanically-assisted motion of the grating couplers 16, 18. The grating couplers 16, 18 lack moving mechanical parts and are stationary relative to the substrate 20 during operation.

In spherical coordinates, the angles of the axes 44, 45 within the reference plane of the substrate 20 may be referred to as azimuthal angles, and the emission angles out of the reference plane may be referred to as elevational angles. Through routing selected by the optical switch 14, the stream of optical signals may be emitted from each of the grating couplers 16, 18 with different combinations of azimuthal and elevational angles to provide beam scanning.

The optical switch 14 and grating couplers 16, 18 enable optical signals to be scanned without the need for multiple lasers and without the need for moving mechanical parts. In an alternative embodiment, multiple lasers 22 may be coupled to the input waveguide 12 and multiplexed optical signals may be provided via the input waveguide 12 to the structure 10 at multiple different wavelengths to provide multiple scanned and steered sets of optical signals. Additional azimuthal and elevational angle combinations may be thereby provided from the set of grating couplers 16, 18 due to the presence of different wavelengths.

The structure 10, in any of its embodiments described herein, may be integrated into a photonics chip that includes electronic components and additional optical components. For example, the electronic components may include field-effect transistors that are fabricated by CMOS front-end-of-line (FEOL) processing.

Figure 4:
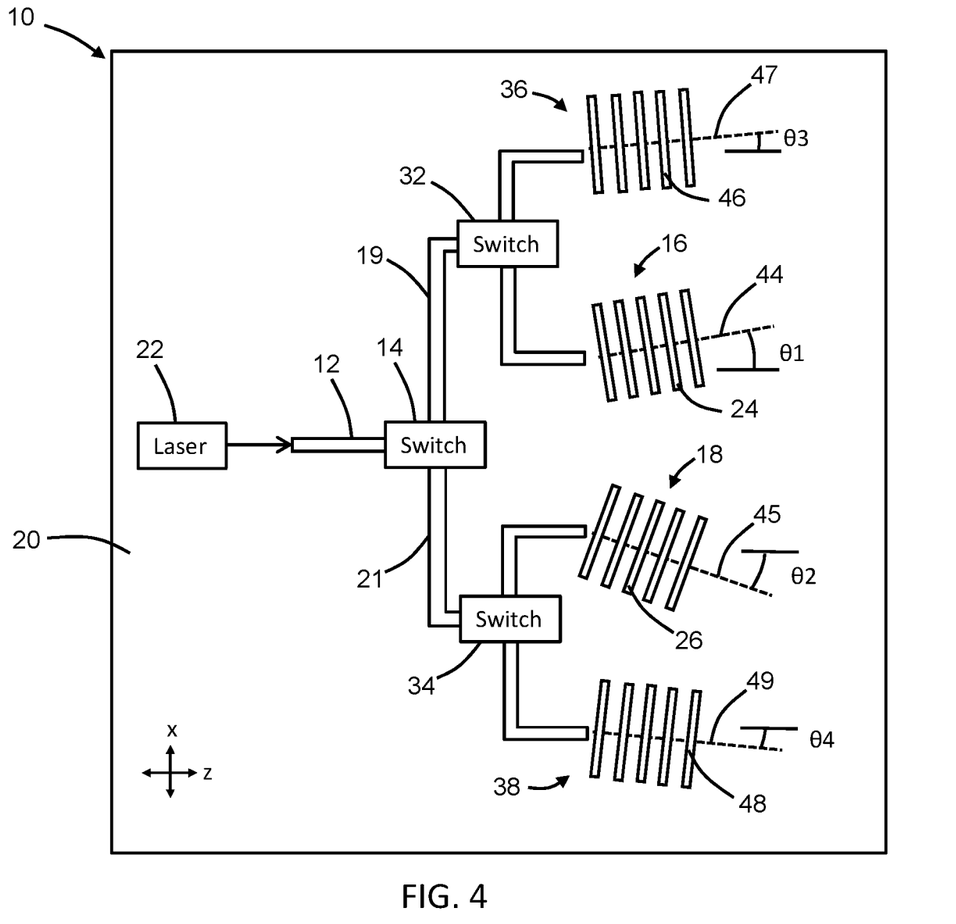
FIG. 4 is a top view of a photonics chip including a structure in accordance with alternative embodiments of the invention.

With reference to FIG. 4 in which like reference numerals refer to like features in FIG. 1 and in accordance with alternative embodiments of the invention, the structure 10 may be modified to add additional optical switches 32, 34 and grating couplers 36, 38 that are arranged in an array. The grating couplers 36, 38 are similar to the grating couplers 16, 18 other than having different individual angular orientations than either of the grating couplers 16, 18 and, optionally, different pitches than each other and/or one or both of the grating couplers 16, 18. The grating couplers 16, 18, 36, 38 and optical switches 14, 32, 34 are coupled by the optical paths defined by a network of connecting waveguides to provide the array with the capability of covering a range of angles within the horizontal plane of the substrate 20 and a range of emission angles angled out of the horizontal plane of the substrate 20.

Various routing options from the input waveguide 12 to the different grating couplers 16, 18, 36, 38 may be selected by operating the optical switches 14, 32, 34 with control logic to choose a specific path. For example, the stream of optical signals may be routed in a path by the optical switches 14 and 32 to the uppermost grating coupler 36 for emission with the angular conditions of the grating coupler 36, or the stream of optical signals may be routed in a path by the optical switches 14 and 34 to the lower most grating coupler 38 for emission with the angular conditions of the grating coupler 38.

Each of the grating couplers 16, 18, 36, 38 may be positioned with different angular orientations that are precisely determined during fabrication. The grating coupler 36 includes grating structures 46 arranged along an axis 47 and separated by physical spaces or grooves similar to grooves 40, 42 such that the grating structures 46 are raised relative to the horizontal plane of the substrate 20. The grating structures 46 are aligned with an angular orientation given by an angle, $\theta 3$, within the horizontal plane of the substrate 20. The grating coupler 38 also includes grating structures 48 arranged along an axis 49 and separated by spaces or grooves similar to grooves 40, 42 such that the grating structures 48 are raised relative to the horizontal plane of the substrate 20. The grating structures 48 are aligned with an angular orientation given by an angle, $\theta 4$, within the horizontal plane of the substrate 20.

In an embodiment, the angular orientations of the grating couplers 16, 18, 36, 38 may all have different configurations such that the axes 44, 45, 47, 49 are mutually nonparallel. In an alternative embodiment, two or more of the angular orientations, but not all of the angular orientations, may be equal. For example, the axis 47 may be aligned parallel with the axis 49 such that the angle, $\theta 3$, of the grating structures 46 is equal to the angle, θ4, of the grating structures 48. In an embodiment, the pitches of two or more the grating structures 24, 26, 46, 48 may be adjusted to adjust the respective emission angles as previously described.

The structure 10 provides a digital high-speed, low-power, and non-mechanical device capable of scanning an optical signal stream from one or more lasers in an inexpensive form factor. In an embodiment, the array may include an arrangement of 256×256 grating couplers and enough serially-arranged optical switches to provide signal routing.

Figure 5:
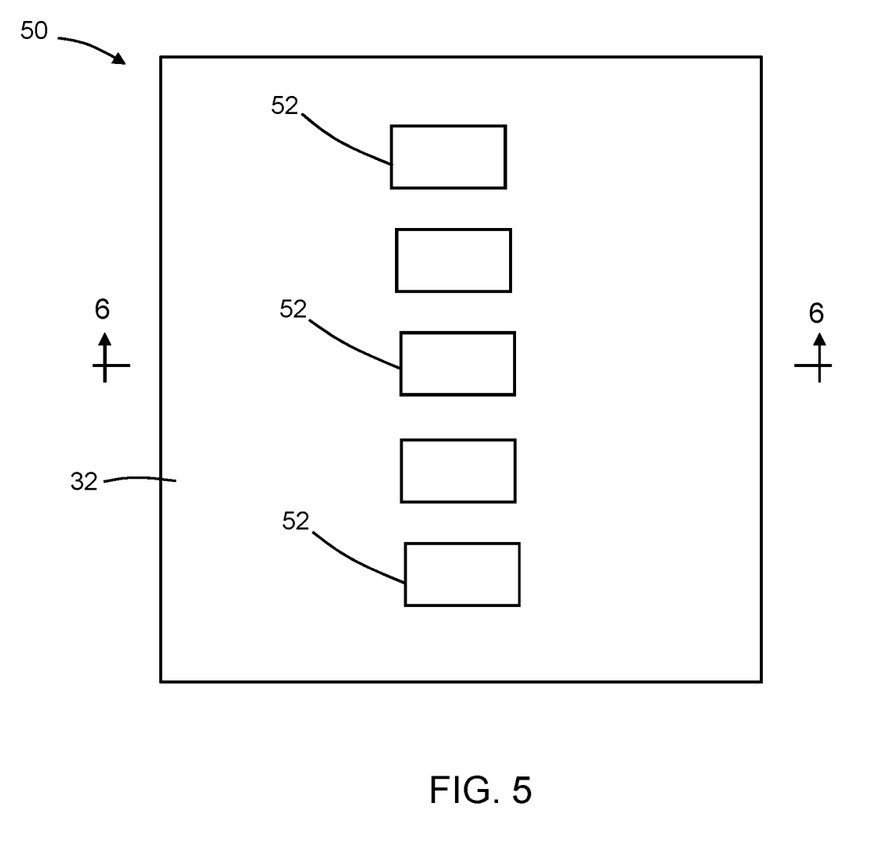
FIG. 5 is a top view of a structure for a grating coupler at an initial fabrication stage of a processing method in accordance with embodiments of the invention.
Figure 6:
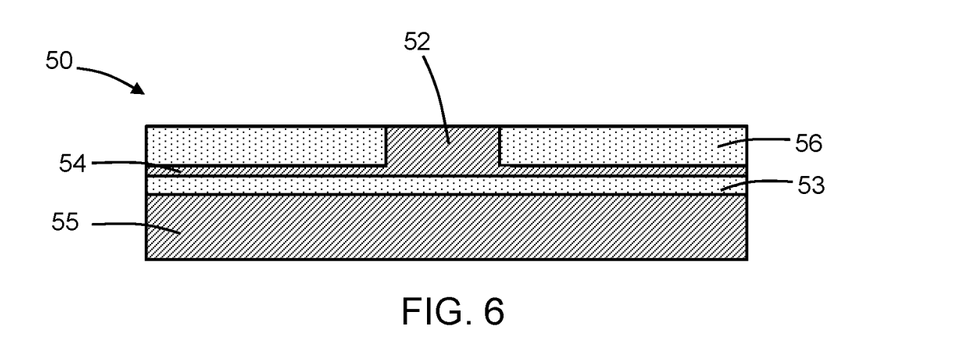
FIG. 6 is a cross-sectional view of the structure taken generally along line 6-6 in FIG. 5.

With reference to FIGS. 5, 6 and in accordance with alternative embodiments of the invention, a grating coupler 50 has a construction that may be used to form each of the grating couplers 16, 18 of the structure 10. The grating coupler 50 may integrate a material containing an optical index film into its construction to permit a change in angle of the output optical signals. This alteration in the construction may provide an alternative to variations in pitch for selecting the respective out-of-plane emission angles of the grating couplers 16, 18.

The grating coupler 50 includes grating structures 52 that are formed by lithography and etching processes from a single-crystal semiconductor material (e.g., single-crystal silicon), such as a device layer 54 of a silicon-on-insulator (SOI) wafer. The grating coupler 50 is arranged over a buried insulator layer 53 and a substrate 55 of the SOI wafer. The etching process forming the grating structures 52 may only partially etch through the device layer 54 such that thinned sections of the device layer 54 remain connect the grating structures 52. Shallow trench isolation regions 56, which fill the space surrounding the grating structures 52, may be composed of a dielectric material, such as silicon dioxide, that is deposited and planarized by chemical-mechanical polishing.

Figure 7:
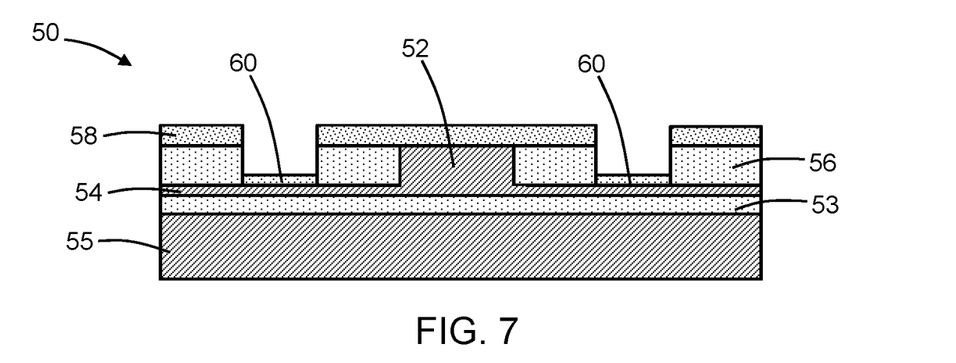
FIGS. 7-9 are cross-sectional views of the structure at successive fabrication stages subsequent to FIG. 6.

With reference to FIG. 7 in which like reference numerals refer to like features in FIG. 6 and at a subsequent fabrication stage, a dielectric layer 58 composed of a dielectric material, such as silicon nitride, is deposited over the grating structures 52 and shallow trench isolation regions 56. The dielectric layer 58 and the shallow trench isolation regions 56 are patterned by lithography and etching processes to respectively define openings in the dielectric layer 58 and recesses in the shallow trench isolation regions 56 proximate to the grating structures 52.

A silicide layer 60 is formed in sections that are arranged inside the recesses in the shallow trench isolation regions 56. The sections of the silicide layer 60 provide individual resistance heaters configured to respond to an applied current by resistive heating. The silicide layer 60 may be formed by a silicidation process involving the deposition of a layer of a silicide-forming metal by, for example, chemical vapor deposition or physical vapor deposition, followed by one or more annealing steps (e.g., rapid thermal annealing) to form a silicide phase by reacting the layer of silicide-forming metal and the contacting semiconductor material of the device layer 54. Candidate materials for the silicide-forming metal include, but are not limited to, nickel, titanium, cobalt, palladium, or a combination of these metals, or other metals capable of reacting with silicon to form a low-resistivity, thermally-stable silicide. Residual silicide-forming metal may be removed by wet chemical etching.

Figure 8:
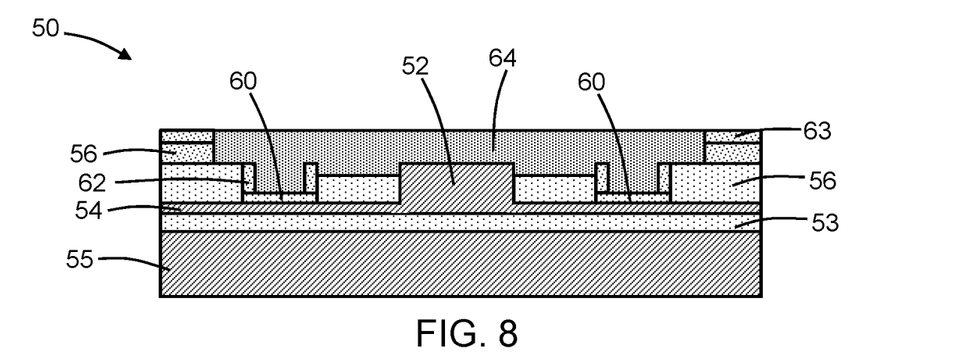

With reference to FIG. 8 in which like reference numerals refer to like features in FIG. 7 and at a subsequent fabrication stage, spacers 62 are formed over the sections of the silicide layer 60 inside the recesses in the shallow trench isolation regions 56. The spacers 62 may be composed of a dielectric material, such as silicon nitride, deposited as a conformal layer 63 by atomic layer deposition. The shallow trench isolation regions 56 adjacent to the grating structures 52 may be recessed slightly relative to the grating structures 52 with an etching process. Alternatively, the recessing of the shallow trench isolation regions 56 may be omitted.

An active layer 64 composed of a material having a temperature-dependent index of refraction is deposited and patterned with lithography and etching processes. In an embodiment, the active layer 64 may be composed of a phase change material characterized by an index of refraction that varies as a function of its temperature. In an embodiment, the active layer 64 may be composed of vanadium dioxide. In other embodiments, the active layer 64 may be composed of another type of inorganic material, such as germanium-antimony telluride. The active layer 64 may be deposited by, for example, chemical vapor deposition and etched back to provide a given thickness.

A portion of the active layer 64 is arranged over the grating structures 52 and wraps about the sidewalls on all sides of the grating structures 52 exposed by the recessing of the shallow trench isolation regions 56. Other portions of the active layer 64 are arranged over the sections of the silicide layer 60, and still other portions of the active layer 64 are arranged over the shallow trench isolation regions 56. The active layer 64 may include topography, including divots (not shown) over the sections of the silicide layer 60.

The index of refraction of the active layer 64 may be tuned as a function of the temperature of the active layer 64. To that end, a current may be applied to the sections of the silicide layer 60 to produce heat by resistive heating that is transferred by thermal conduction to the active layer 64. The incoming heat causes the temperature of the active layer 64 to increase as a function of the amount of heat received from the sections of the silicide layer 60. In an alternative embodiment, some or all of the heating of the active layer 64 may be produced by applying a bias voltage directly to the active layer 64 to provide resistive heating.

The ability to tune the index of refraction of the active layer 64 with temperature provides the grating coupler 50 with the ability to deflect optical signals at different out-of-plane emission angles from the grating coupler 50. The grating coupler 50 may possess multiple emission angles based upon the temperature of the active layer 64.

Figure 9:
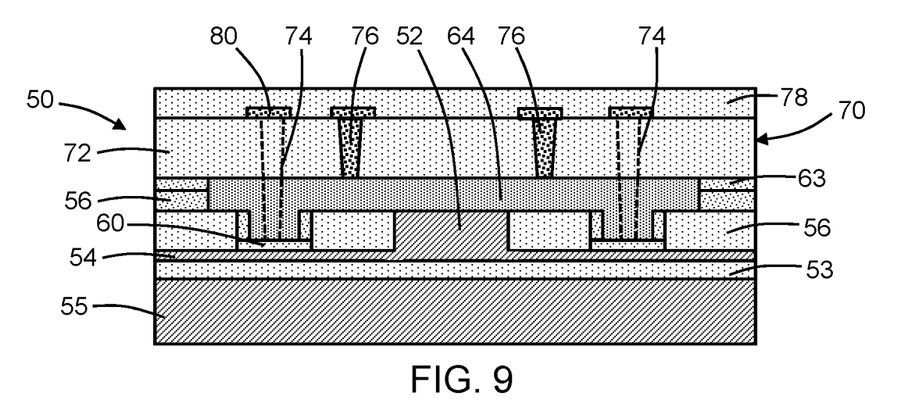

With reference to FIG. 9 in which like reference numerals refer to like features in FIG. 8 and at a subsequent fabrication stage, an interconnect structure, generally indicated by reference numeral 70, includes metallization levels that are formed by middle-of-line (MOL) processing and back-end-of-line (BEOL) processing. The interconnect structure 70, which is arranged over the substrate 20, may include a dielectric layer 72, contacts 74, 76 located in the dielectric layer 72, a dielectric layer 78, and wiring 80 located in the dielectric layer 78. Contacts 74 may be formed that connect the sections of the silicide layer 60 with the wiring 80 in the interconnect structure 70. Contacts 76, which are optional, may be formed that connect the active layer 64 with the wiring 80 in the interconnect structure 70. The contacts 76 and wiring 80 may be used to directly bias the active layer 64 and provide a secondary heat source. The contacts 74, 76 and wiring 80 may be composed of one or more metals, such as tungsten, copper, or cobalt, and are located in etched openings or trenches in the dielectric layers 72, 78. The dielectric layers 72, 78 may be composed of a dielectric material, such as silicon dioxide, deposited by chemical vapor deposition.

Through these connections, a voltage may be applied from the contacts 74 and wiring 80 in the interconnect structure 70 to the sections of the silicide layer 60, which causes the sections of the silicide layer 60 to function as heaters used to heat the material in the active layer 64 to a given temperature. The temperature of the active layer 64 may be controlled by regulating the heat emitted from the sections of the silicide layer 60. A voltage may be optionally or alternatively supplied from the contacts 76 and wiring 80 to cause direct heating of the active layer 64.

Figure 10:
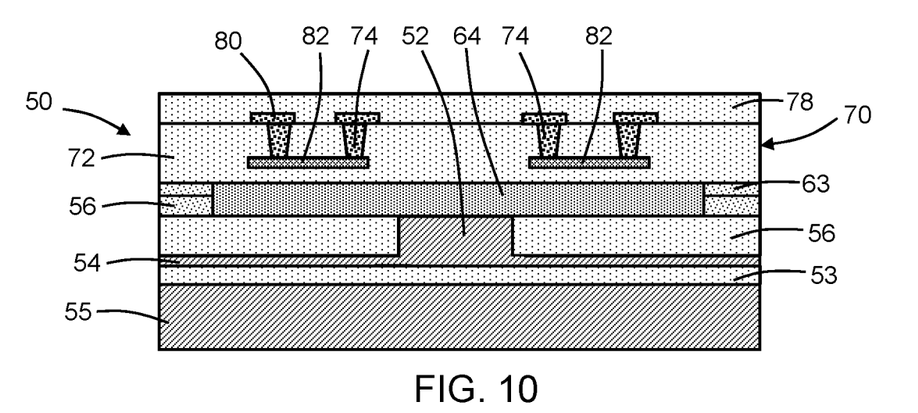
FIG. 10 is a cross-sectional view of a structure for a grating coupler in accordance with alternative embodiments of the invention.

With reference to FIG. 10 in which like reference numerals refer to like features in FIG. 9 and in accordance with alternative embodiments, thin film resistors 82 may be formed in the interconnect structure 70 over the active layer 64 and may be connected by contacts 74 with wiring 80 in the interconnect structure 70. The thin film resistors 82 provide individual resistance heaters that respond to an applied current by resistive heating. The thin film resistors 82 may be composed of a material, such as nickel-chrome, tantalum nitride, or titanium nitride. Similar to the heaters provided by the sections of the silicide layer 60, heat from the thin film resistors 82 may be used to change the temperature of the active layer 64. The thin film resistors 82 may replace the sections of the silicide layer 60 as the heat source used to modify the index of refraction of the grating coupler 50.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   an input waveguide;
   a first grating coupler including a first plurality of grating structures spaced with a first pitch along a first axis;
   a second grating coupler including a second plurality of grating structures spaced with a second pitch along a second axis;
   a first optical switch coupled to the first grating coupler and to the second grating coupler, the first optical switch configured to select between the first grating coupler and the second grating coupler for optical signal routing; and
   a second optical switch located between the input waveguide and the first optical switch, the second optical switch coupled to the first optical switch,
   wherein the second axis of the second grating coupler is aligned nonparallel to the first axis of the first grating coupler.

2. The structure of claim 1 further comprising:
   a third grating coupler coupled to the second optical switch,
   wherein the second optical switch is configured to select between the third grating coupler and the first optical switch for optical signal routing.

3. The structure of claim 2 wherein the third grating coupler includes a third plurality of grating structures spaced with a third pitch along a third axis, the third axis is aligned nonparallel to the first axis, and the third axis is aligned nonparallel to the second axis.

4. The structure of claim 3 wherein the first pitch and the second pitch are not equal, the first pitch and the third pitch are not equal, and the second pitch and the third pitch are not equal.

5. The structure of claim 2 wherein the third grating coupler includes a third plurality of grating structures spaced with a third pitch along a third axis, and the third axis is aligned parallel to the first axis.

6. The structure of claim 1 wherein the first pitch is equal to the second pitch.

7. The structure of claim 1 wherein the first pitch and the second pitch are not equal.

8. A structure comprising:
   a first grating coupler including a first plurality of grating structures spaced with a first pitch along a first axis;
   a second grating coupler including a second plurality of grating structures spaced with a second pitch along a second axis;
   an optical switch coupled to the first grating coupler and to the second grating coupler, the optical switch configured to select between the first grating coupler and the second grating coupler for optical signal routing; and an active layer arranged over the first plurality of grating structures, the active layer comprised of a tunable material having a temperature-dependent index of refraction, wherein the second axis of the second grating coupler is aligned nonparallel to the first axis of the first grating coupler.

9. The structure of claim 8 further comprising:

an interconnect structure including a first contact connected with the active layer, a second contact connected with the active layer, and a back-end-of-line stack including wiring located over the active layer and the first plurality of grating structures, wherein the first contact and the second contact couple the active layer to the wiring in the back-end-of-line stack.

10. The structure of claim 9 wherein the interconnect structure further includes a heater located adjacent to the active layer.

11. The structure of claim 8 further comprising:

a heater located adjacent to the active layer.

12. The structure of claim 1 wherein the first grating coupler, the second grating coupler, the first optical switch, and the second optical switch are located on a photonics chip.

13. The structure of claim 1 further comprising:

a first laser configured to emit a first stream of optical signals, wherein the first laser is coupled by the input waveguide with the second optical switch.

14. The structure of claim 13 wherein the first laser is configured to operate at a first wavelength, and further comprising:

a second laser configured to emit a second stream of optical signals, the second laser coupled by the input waveguide with the second optical switch.

15. A method comprising:

forming an input waveguide;

forming a first grating coupler having a first plurality of grating structures spaced with a first pitch along a first axis;

forming a second grating coupler having a second plurality of grating structures spaced with a second pitch along a second axis;

forming a first optical switch coupled to the first grating coupler and the second grating coupler;

forming a second optical switch located in an optical path between the input waveguide and the first optical switch; and forming a third grating coupler coupled to the second optical switch, wherein the second optical switch is coupled to the first optical switch, and the second axis of the second grating coupler is aligned nonparallel to the first axis of the first grating coupler.

16. The method of claim 15 wherein the first pitch and the second pitch are not equal.

17. The method of claim 15 further comprising:

forming an active layer arranged over the first plurality of grating structures; and forming a heater proximate to the active layer, wherein the active layer comprises a tunable material having a temperature-dependent index of refraction.

18. The structure of claim 1 further comprising:

a connecting waveguide, wherein the second optical switch is coupled to the first optical switch by the connecting waveguide.

19. The structure of claim 1 further comprising:

an active layer arranged over the first plurality of grating structures, the active layer comprised of a tunable material having a temperature-dependent index of refraction.

20. The structure of claim 8 further comprising:

a first laser configured to emit a first stream of optical signals at a first wavelength;

an input waveguide coupling the first laser with the optical switch; and a second laser configured to emit a second stream of optical signals, the second laser coupled by the input waveguide with the optical switch.

* * * * *